(12) United States Patent
Tamaoki

(10) Patent No.: US 8,115,838 B2
(45) Date of Patent: Feb. 14, 2012

(54) SIGNAL PROCESSING DEVICE FOR SOLID-STATE IMAGING DEVICE, IMAGING APPARATUS HAVING THE SIGNAL PROCESSING DEVICE, SIGNAL PROCESSING METHOD, AND PROGRAM WHICH ALLOW INTER-PIXEL COLOR MIXING TO BE PROPERLY CORRECTED EVEN WHEN COLOR MIXING RATIOS RE TWO-DIMENSIONALLY DISTRIBUTED IN A PIXEL ARRAY SURFACE

(75) Inventor: Akihiro Tamaoki, Tokyo (JP)

(73) Assignee: Sony Corporation (JP)

( * ) Notice: Subject to any disclaimer, the term of this patent is extended or adjusted under 35 U.S.C. 154(b) by 513 days.

(21) Appl. No.: 12/287,101

(22) Filed: Oct. 6, 2008

(65) Prior Publication Data

US 2009/0096887 A1    Apr. 16, 2009

(30) Foreign Application Priority Data

Oct. 16, 2007   (JP) ............................... P2007-269238

(51) Int. Cl.
*G06K 9/00* (2006.01)
*H04N 17/00* (2006.01)
*H04N 9/083* (2006.01)

(52) U.S. Cl. .......................... 348/273; 382/167; 348/187
(58) Field of Classification Search .................. 382/167; 348/187, 222.1, 272, 273
See application file for complete search history.

(56) References Cited

U.S. PATENT DOCUMENTS

| | | | |
|---|---|---|---|
| 5,673,336 A * | 9/1997 | Edgar et al. | 382/167 |
| 6,970,597 B1 * | 11/2005 | Olding et al. | 382/167 |
| 2005/0057655 A1 * | 3/2005 | Duesman et al. | 348/187 |
| 2007/0146511 A1 | 6/2007 | Kinoshita et al. | |
| 2009/0147110 A1 * | 6/2009 | Muramatsu et al. | 348/255 |

FOREIGN PATENT DOCUMENTS

| | | |
|---|---|---|
| JP | 2004-135206 A | 4/2004 |
| JP | 2004-287794 A | 10/2004 |
| JP | 2005-269339 A | 9/2005 |
| JP | 2006-121612 A | 5/2006 |
| JP | 2007-142697 A | 6/2007 |
| WO | WO 2006054607 A1 * | 5/2006 |

* cited by examiner

*Primary Examiner* — Timothy J Henn
(74) *Attorney, Agent, or Firm* — Lerner, David, Littenberg, Krumholz & Mentlik, LLP

(57) ABSTRACT

A signal processing device for a solid-state imaging device correcting inter-pixel color mixing in the solid-state imaging device in which color filters having a color component constituting a primary component among luminance components and other color components are disposed on a surface of a two-dimensional array of pixels including a photoelectric conversion element is disclosed. The signal processing device includes a parameter distribution unit two-dimensionally distributing correction parameters in a pixel array surface on which a plurality of pixels are arranged and a signal correcting unit correcting a signal for a pixel of interest using each of signals for a plurality of surrounding pixels adjacent to the pixel of interest in the pixel array surface and using two-dimensionally distributed correction parameters for each of the signals.

13 Claims, 10 Drawing Sheets

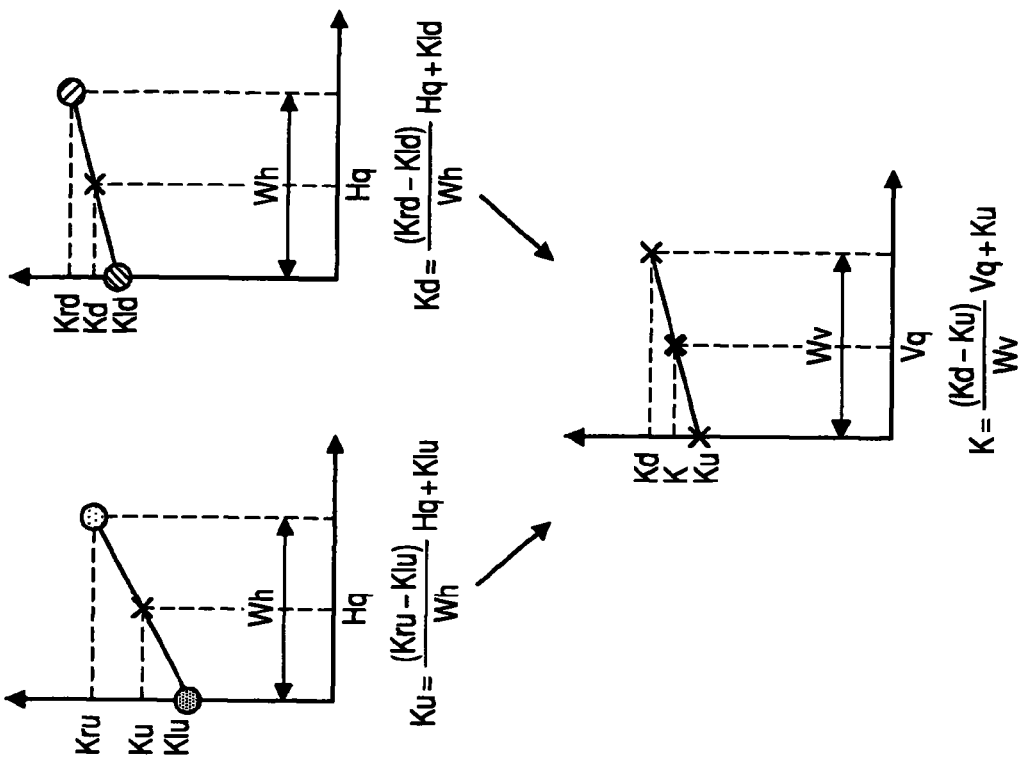
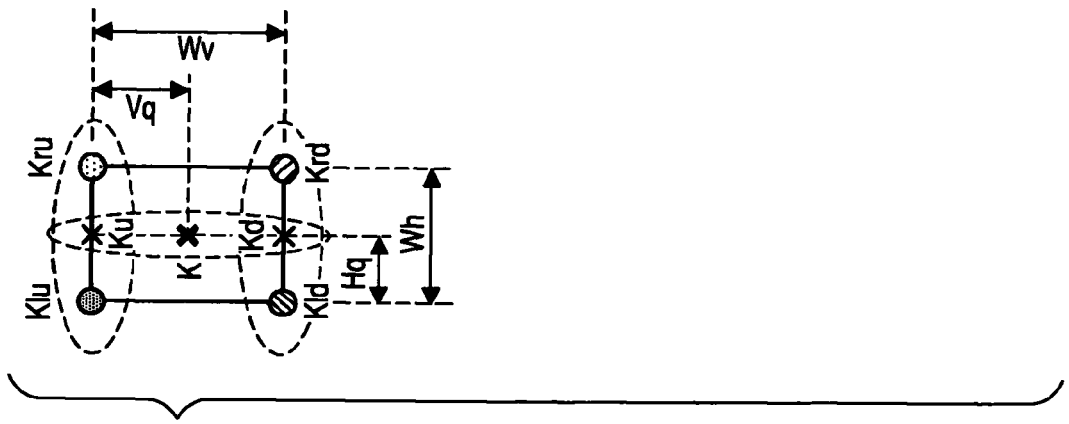
FIG. 5

$$Ku = \frac{(Kru - Klu)}{Wh}(-Hq) + Klu$$

$$Ku = \frac{(Kru - Klu)}{Wh}(Hq + Wh) + Klu$$

SIGNAL PROCESSING DEVICE FOR SOLID-STATE IMAGING DEVICE, IMAGING APPARATUS HAVING THE SIGNAL PROCESSING DEVICE, SIGNAL PROCESSING METHOD, AND PROGRAM WHICH ALLOW INTER-PIXEL COLOR MIXING TO BE PROPERLY CORRECTED EVEN WHEN COLOR MIXING RATIOS RE TWO-DIMENSIONALLY DISTRIBUTED IN A PIXEL ARRAY SURFACE

CROSS REFERENCE TO RELATED APPLICATION

The present application claims priority from Japanese Patent Application JP No. 2007-269238 filed in the Japanese Patent Office on Oct. 16, 2007, the entire content of which is incorporated herein by reference.

BACKGROUND OF THE INVENTION

1. Field of the Invention

The present invention relates to a signal processing device for a solid-state imaging device, an imaging apparatus having the signal processing device, a signal processing method, and a program.

2. Description of the Related Art

A solid-state imaging device such as a CCD image sensor or CMOS image sensor has a structure in which a color filter and a light-collecting micro-lens are formed in the order listed on a surface of a pixel including a photoelectric conversion element. In such a solid-state imaging device, since a color filter is interposed between a pixel and a micro-lens, the distance between the pixel and the micro-lens is increased by the filter. When a distance between pixels is reduced in proportion to a reduction of pixel size, the possibility of inter-pixel color mixing increases because a light ray which has passed through a certain pixel can more easily enter another pixel in the neighborhood.

As a solution to such a problem, JP-A-2004-135206 (Patent Document 1) discloses a color mixing reducing device which subtracts a certain percentage of signal components from a signal for a pixel of interest in a particular color, the percentage being calculated from signals for surrounding pixels (in colors other than the particular color) adjacent to the pixel of interest. In order to calculate a certain percentage of signal components as thus described, the color mixing reducing device uses a uniform correction parameter for each of row and column directions of a pixel array surface on which a plurality of pixels are two-dimensionally arranged.

However, it is known that mixing of the color of a pixel of interest with the colors of a plurality of surrounding pixels adjacent to the same does not necessarily occur in an isotropic manner in an actual solid-state imaging device. As a solution to this, JP-A-2007-142697 (Patent Document 2) discloses a signal processing apparatus which corrects a signal for a pixel of interest using each of signals for a plurality of surrounding pixels adjacent to the pixel of interest and a correction parameter independently set for each of the signals. In order to cope with the anisotropy of color mixing, this signal processing apparatus uses a correction parameter which is uniform in a pixel array surface and which is set for each signal (color).

SUMMARY OF THE INVENTION

In a large-sized solid-state imaging device having fine pixels used in applications such as digital single lens reflex cameras, color mixing occurs differently between central and peripheral regions of a pixel array surface because the angle of incidence of object light varies significantly between those regions. Specifically, since color mixing ratios are two-dimensionally distributed in the pixel array surface, a problem arises in that inter-pixel color mixing cannot be properly corrected by using correction parameters which are uniform in the pixel array surface as done in the related art.

Thus, it is desirable to provide a novel and improved signal processing device for a solid-state imaging device, an imaging apparatus having such a signal processing device, a signal processing method, and a program which allow inter-pixel color mixing to be properly corrected even when color mixing ratios are two-dimensionally distributed in a pixel array surface.

It is also desirable to provide a novel and improved signal processing device for a solid-state imaging device, an imaging apparatus having such a signal processing device, a signal processing method, and a program which allow a signal for a pixel of interest to be properly processed even when parameters are two-dimensionally distributed in a pixel array surface.

In one embodiment of the invention, there is provided a signal processing device for a solid-state imaging device correcting inter-pixel color mixing in the solid-state imaging device in which color filters having a color component constituting a primary component among luminance components and other color components are disposed on a surface of a two-dimensional array of pixels including a photoelectric conversion element. The signal processing device for a solid-state imaging device includes a parameter distribution unit two-dimensionally distributing correction parameters in a pixel array surface on which a plurality of pixels are arranged and a signal correcting unit correcting a signal for a pixel of interest using each of signals for a plurality of surrounding pixels adjacent to the pixel of interest in the pixel array surface and using two-dimensionally distributed correction parameters for each of the signals.

In such a configuration, correction parameters are two dimensionally distributed in the pixel array surface on which a plurality of pixels are arranged. A signal for a pixel of interest is corrected using each of signals for a plurality of surrounding signals adjacent to the pixel of interest in the pixel array surface and using two-dimensionally distributed correction parameters for each of the signals. Since correction parameters for each of the signals for the surrounding pixels are two-dimensionally distributed, inter-pixel color mixing can be properly corrected even when color mixing ratios are two-dimensionally distributed in the pixel array surface.

The parameter distribution unit may interpolate the correction parameters for each of the signals for the surrounding pixels using a correction parameter set for each of control points which are points at boundaries between a plurality of pixel regions formed by dividing the pixel array surface. In such a configuration, the correction parameters for each of the signals for the surrounding pixels are interpolated using the correction parameters set for the control points. It is therefore possible to calculate correction parameters which are two-dimensionally distributed in the pixel array surface. Correction parameters can be two-dimensionally distributed in the pixel array surface only by setting a correction parameter for each of control points which are provided in a minimum quantity required.

The parameter distribution unit may obtain two interpolation values by performing linear interpolation of correction parameters set for two pairs of control points adjacent to each other in either row direction or column direction of the pixel array surface. The correction parameters for each of the signals for the surrounding pixels may be linearly interpolated using the two interpolation values in the other of the row and column directions. In such a configuration, the correction parameters for each of the signals for surrounding pixels may be calculated by performing linear interpolation using the correction parameters set for the control points. In particular, when the correction parameters are distributed in a shape that is suitable for linear approximation, the correction parameters for each of the signals for the surrounding pixels can be calculated with high accuracy.

The parameter distribution unit may obtain three interpolation values by performing curved interpolation of correction parameters set for three pairs of control points of four pixel regions adjacent to each other in the row and column directions of the pixel array surface, each pairs of control points being adjacent to each other in either row or column direction of the pixel array surface. The correction parameters for each of the signals for the surrounding pixels may be curve-interpolated using the three interpolation values in the other of the row and column directions. In such a configuration, the correction parameters for each of the signals for the surrounding pixels can be calculated by performing curved interpolation using the correction parameters set for the control points. In particular, when the correction parameters are distributed in a shape suitable for curved approximation, the correction parameters for each of the signals for the surrounding pixels can be calculated with high accuracy.

In the case of a pixel region located in a peripheral part of the pixel array surface and having control points only at part of four corners thereof, the parameter distribution unit may interpolate the correction parameters for each of the signals for the surrounding pixels using correction parameters set for control points provided at four corners of a pixel region adjacent to the pixel region of interest. In such a configuration, even of signals for surrounding pixels in such a pixel region located in a peripheral part of the pixel array surface and having control points only at part of four corners thereof can be calculated by performing interpolation using the correction parameters set for the adjacent pixel region.

The parameter distribution unit may switch methods of calculating correction parameters for each of signals for surrounding pixels depending on whether the pixel array surface includes a pixel region having control points at only part of four corners thereof or not. In such a configuration, since the correction parameter calculation methods are switched depending on the condition of the pixel array surface of the solid-state imaging device, correction parameters for each of signals for surrounding pixels can be calculated according to the condition of the solid-state imaging device.

In another embodiment of the invention, there is provided a signal processing device for a solid-state imaging apparatus processing a signal for a pixel using uniform parameters in a pixel array surface on which a plurality of pixels are arranged. The signal processing device for a solid-state imaging device includes a parameter distribution unit interpolating a parameter for a signal for a particular pixel using a parameter non-uniformly set for each of control points in the pixel array surface to two-dimensionally distribute parameters in the pixel array surface, the control points being points at boundaries between a plurality of pixel regions formed by dividing the pixel array surface. The device also includes a signal processing unit processing a signal for a pixel to be processed using the two-dimensionally distributed parameters for the particular pixel.

In such a configuration, since the parameter for the signal for the particular pixel is interpolated using the parameters set for the control points, it is possible to calculate parameters which are two-dimensionally distributed in the pixel array surface. Thus, even in a signal processing device for a solid-state imaging device processing a signal for a pixel using parameters which are uniform in a pixel array surface, the provision of the parameter distribution unit allows a signal for a pixel of interest to be properly processed using parameters two-dimensionally distributed in the pixel array surface.

In a further embodiment of the invention, there is provided an imaging apparatus having a signal processing device for a solid-state imaging device according to either of the aspects of the invention.

In a still another embodiment of the invention, there is provided a signal processing method used in a signal processing device correcting inter-pixel color mixing in a solid-state imaging device in which color filters having a color component constituting a primary component among luminance components and other color components are disposed on a surface of a two-dimensional array of pixels including a photoelectric conversion element. The signal processing method includes the steps of two-dimensionally distributing correction parameters in a pixel array surface on which a plurality of pixels are arranged and correcting a signal for a pixel of interest using signals for a plurality of surrounding pixels adjacent to the pixel of interest in the pixel array surface and using two-dimensionally distributed correction parameters for each of the signals.

According to such a method, since correction parameters for each of the signals for the surrounding pixels are two-dimensionally distributed in the pixel array surface, inter-pixel color mixing can be properly corrected even when color mixing ratios are two-dimensionally distributed in the pixel array surface.

In a still another embodiment of the invention, there is provided a signal processing method used in a signal processing device for a solid-state imaging device processing a signal for a pixel using uniform parameters in a pixel array surface on which a plurality of pixels are arranged. The signal processing method includes the step of interpolating a parameter for a signal for a particular pixel using a parameter non-uniformly set for each of control points in the pixel array surface to two-dimensionally distribute parameters in the pixel array surface, the control points being points at boundaries between a plurality of pixel regions formed by dividing the pixel array surface. The method also includes the step of processing a signal for a pixel to be processed using the two-dimensionally distributed parameters for the particular pixel.

According to such a method, the parameter distributing step allows a signal for a pixel of interest to be properly processed using parameters two-dimensionally distributed in the pixel array surface even in a signal processing device for a solid-state imaging device processing a signal for a pixel using parameters which are uniform in the pixel array surface.

In a still another embodiment of the invention, there is provided a program causing a computer to function as a signal processing device for a solid-state imaging device according to either of the aspects of the invention.

According to the embodiments of the invention, it is possible to provide a signal processing device for a solid-state imaging device, an imaging apparatus having such a signal processing device, a signal processing method, and a program which allow inter-pixel color mixing to be corrected even when color mixing ratios are two-dimensionally distributed in a pixel array surface.

According to the embodiments of the invention, it is possible to provide a signal processing device for a solid-state imaging device, an imaging apparatus having such a signal processing device, a signal processing method, and a program which allow a signal for a pixel of interest to be properly processed even when parameters are two-dimensionally distributed in a pixel array surface.

BRIEF DESCRIPTION OF THE DRAWINGS

FIG. 5 is illustrations showing a method for calculating a correction parameter using linear interpolation;

DETAILED DESCRIPTION OF THE INVENTION

Figure 1:
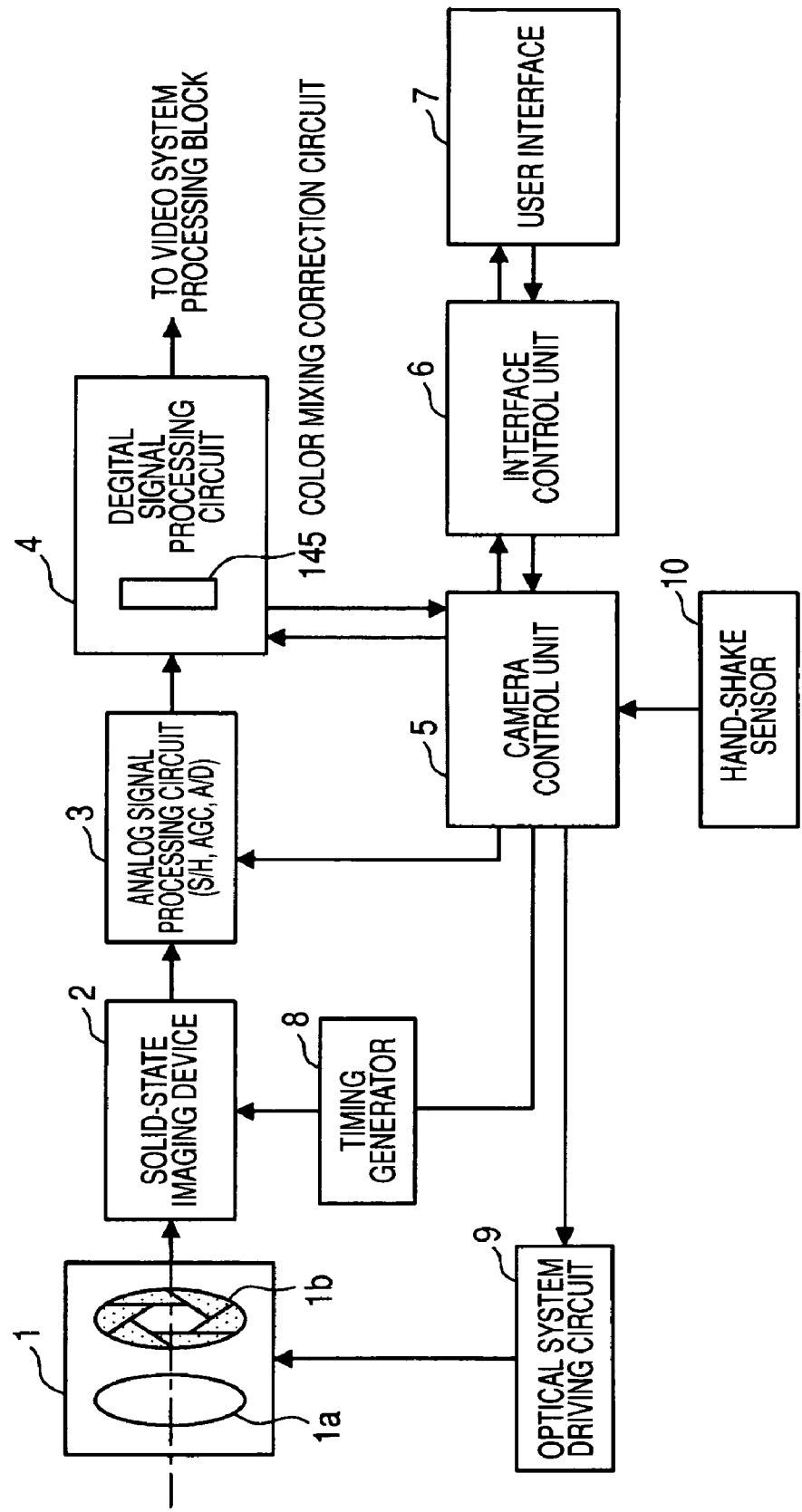
FIG. 1 is a block diagram showing a functional configuration of an imaging apparatus employing a signal processing device in an embodiment the invention.

Embodiments of the invention will now be described in detail with reference to the accompanying drawings. In this specification and the accompanying drawings, elements substantially identical to each other in function and configuration will be indicated by the same reference numeral to avoid duplicated description.

(Functional Configuration of Imaging Apparatus)

FIG. 1 is a block diagram showing a functional configuration of an imaging apparatus employing a signal processing device in an embodiment of the invention. While an application of a signal processing device 100 to a digital video camera as an imaging apparatus will now be described, the signal processing device 100 may be similarly applied to imaging apparatus in general including digital still cameras.

As shown in FIG. 1, the imaging apparatus includes an optical system 1, a solid-state imaging device 2 such as a CMOS image sensor, an analog signal processing circuit 3, a digital signal processing circuit 4, a camera control unit 5, an interface control unit 6, a user interface 7, a timing generator 8, an optical system driving circuit 9, and a hand-shake sensor 10.

The optical system 1 includes a lens 1a forming an image of incident light from an object on an imaging surface of the solid-state imaging device 2 and a diaphragm 1b controlling the quantity of incident light which has passed through the lens 1a. The solid-state imaging device 2 photo-electrically converts incident light from the optical system 1 on a pixel-by-pixel basis and outputs a resultant electrical signal to the analog signal processing circuit 3.

The analog signal processing circuit 3 performs analog-to-digital (A-D) conversion of the analog signal output from the solid-state imaging device 2 by executing signal processing operations such as sample-hold (S-H) and automatic gain control (AGC) processes on the signal. The digital signal processing circuit 4 performs various signal processing operations on the digital signal output from the analog signal processing circuit 3 according to instructions from the camera control unit 5.

Figure 2:
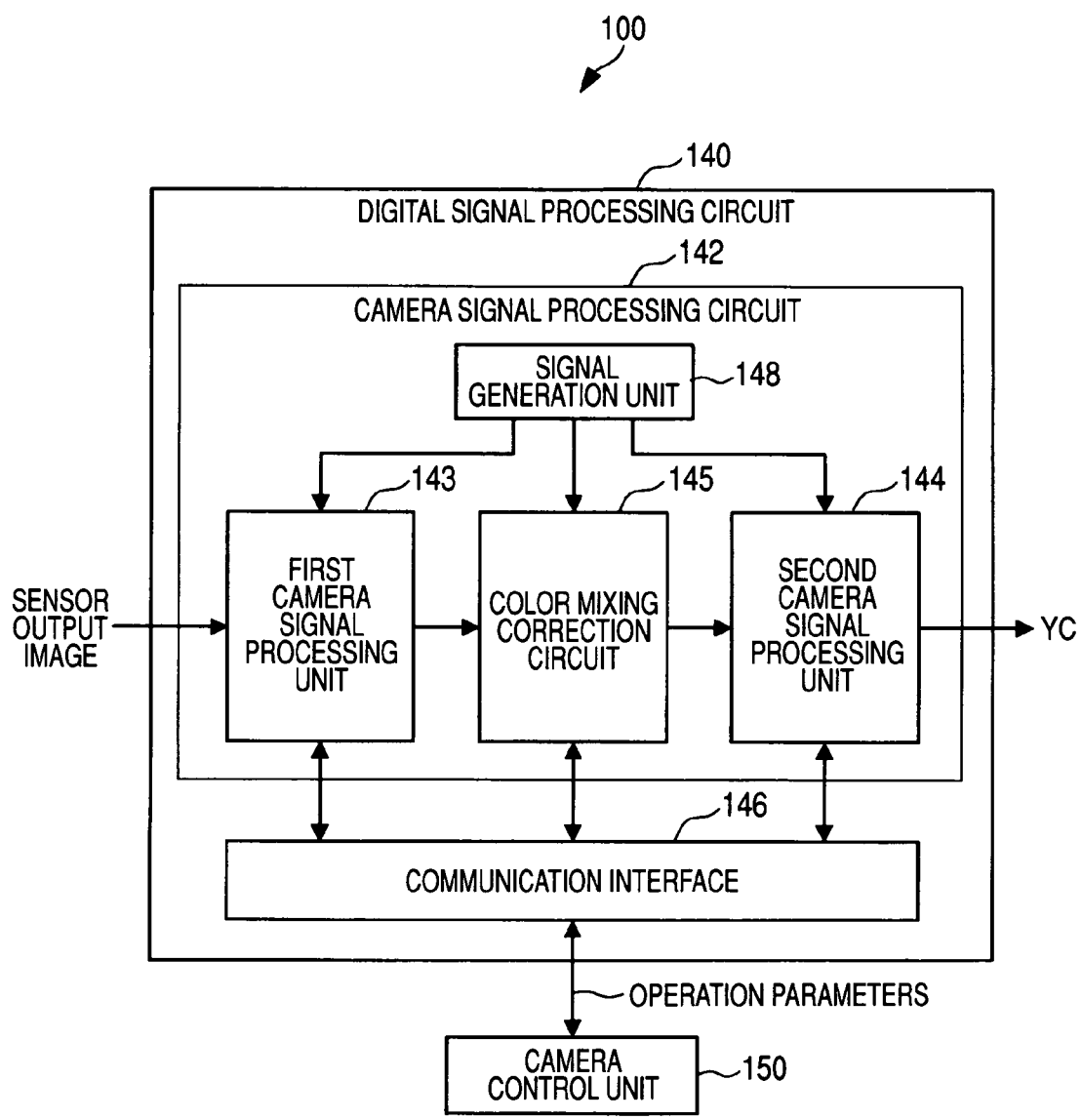
FIG. 2 is a block diagram showing a functional configuration of the signal processing device according to the embodiment of the invention.
Figure 3:
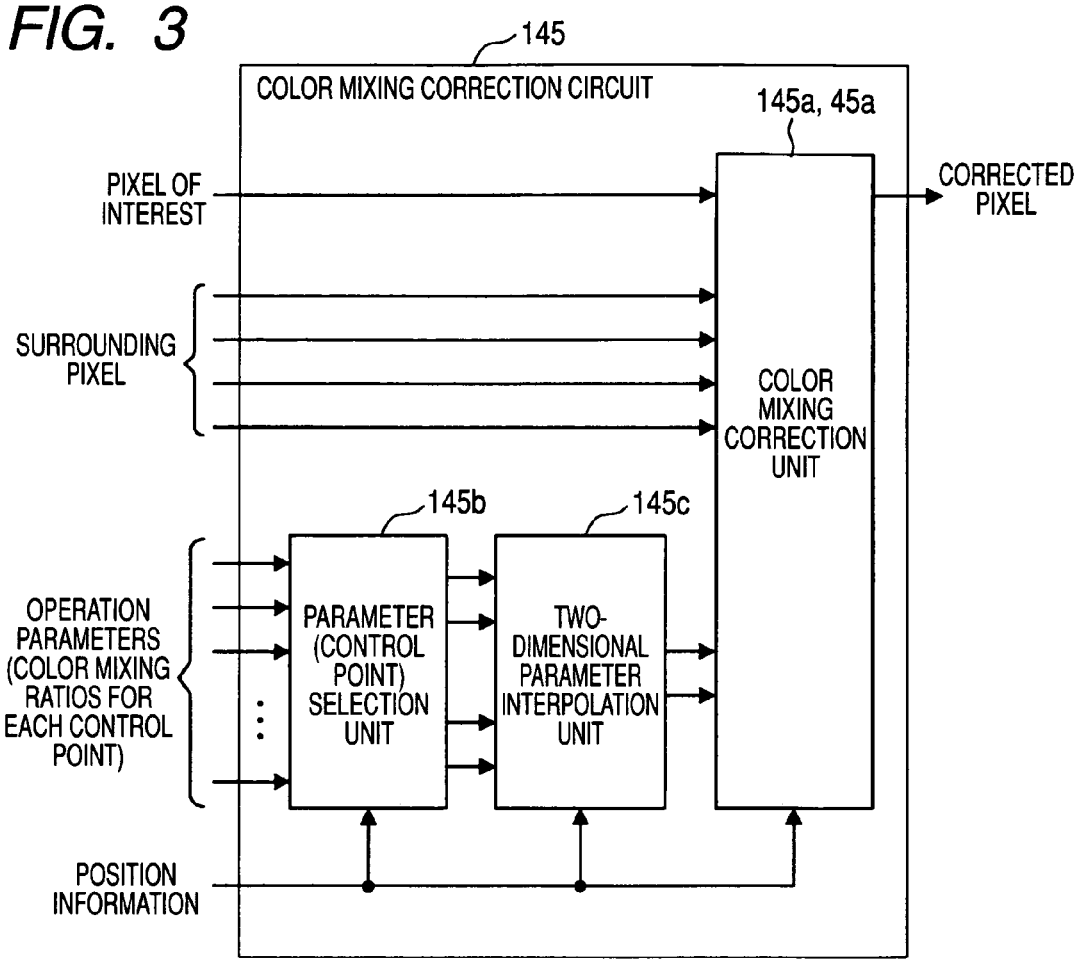
FIG. 3 is a block diagram showing a functional configuration of a color mixing correction circuit included in the signal processing device of a first embodiment of the invention.

The digital signal processing circuit 4 performs camera signal processing operations such as white balance processing, gamma processing, and color-difference processing and signal processing operations such as calculation of detected wave data to be used for camera control. The digital signal processing unit 4 includes a color mixing correction circuit 145 which is illustrated in FIGS. 2 and 3.

The camera control unit 5 recognizes the present state of an input image based on the detected wave data output from the digital signal processing circuit 4 and hand-shake information on the camera output from the hand-shake sensor 10. The camera control unit 5 controls the camera according to various modes of setting which are input through the interface control unit 6 and outputs control data as a result of the control thus exercised to the analog signal processing circuit 3, the digital signal processing circuit 4, the timing generator 8, and the optical system driving circuit 9.

The analog signal processing circuit 3, the digital signal processing circuit 4, the timing generator 8, and the optical system driving circuit 9 perform gain processing, signal processing, a timing generation process, and an optical system driving process, respectively, according to the control data from the camera control unit 5. The solid-state imaging device 2 sequentially picks up signals for arbitrary regions from a pixel array according to a timing signal from the timing generator 8 and outputs them to the analog signal processing circuit 3.

The interface control unit 6 controls menu operations performed by a user through the user interface 7. The interface control unit 6 detects a photographic mode selected by the user and types of control desired by the user and outputs the detected user instruction information to the camera control unit 5. The camera control unit 5 outputs camera control information such as the distance of the object, an F-value, a shutter speed, and magnification to the interface control unit 6 and provides the user with the camera information through the user interface 7.

(Functional Configuration of Signal Processing Device)

FIG. 2 is a block diagram showing a functional configuration of the signal processing device 100 according to the embodiment of the invention.

As shown in FIG. 2, the signal processing device 100 in the embodiment of the invention includes a digital signal processing circuit 140 and a camera control unit 150. The digital signal processing circuit 140 and the camera control unit 150 correspond to the digital signal processing circuit 4 and the camera control unit 5 shown in FIG. 1, respectively.

The digital signal processing circuit 140 includes a camera signal processing circuit 142, a communication interface 146, and a signal generator 148. The camera signal processing circuit 142 includes a first camera signal processing unit 143, a second camera signal processing unit 144, and a color mixing correction circuit 145.

The camera signal processing circuit 142 performs various types of camera signal processing on a signal input from the solid-state imaging device 2 through the analog signal processing circuit 3 according to instructions input from the camera control unit 150 through the communication interface 146. The camera signal processing circuit 142 generates timing for camera signal processing according to various types of timing signals input from the signal generator 148.

The first camera signal processing unit 143 performs a digital clamping process, a noise elimination process, and a defect correction process on the signal input from the solid-state imaging device 2 and outputs a resultant signal to the color mixing correction circuit 145. The color mixing correction circuit 145 performs a color mixing correction process, which will be described later, on the signal from the first camera signal processing unit 143 and outputs a resultant signal to the second camera signal processing unit 144. The second camera signal processing unit 144 performs demosaicing (an interpolation process) on the signal from the color mixing correction circuit 145. A YC process is also performed to generate a luminance signal and a chroma signal which are then output to a video system processing block (not shown) after being subjected to a resolution conversion process.

(Functional Configuration of Color Mixing Correction Circuit)

The color mixing correction circuit 145 included in the signal processing device 100 in the embodiment of the invention will now be described by comparing it with a color mixing correction circuit 45 included in a signal processing device according to the related art.

Figure 11:
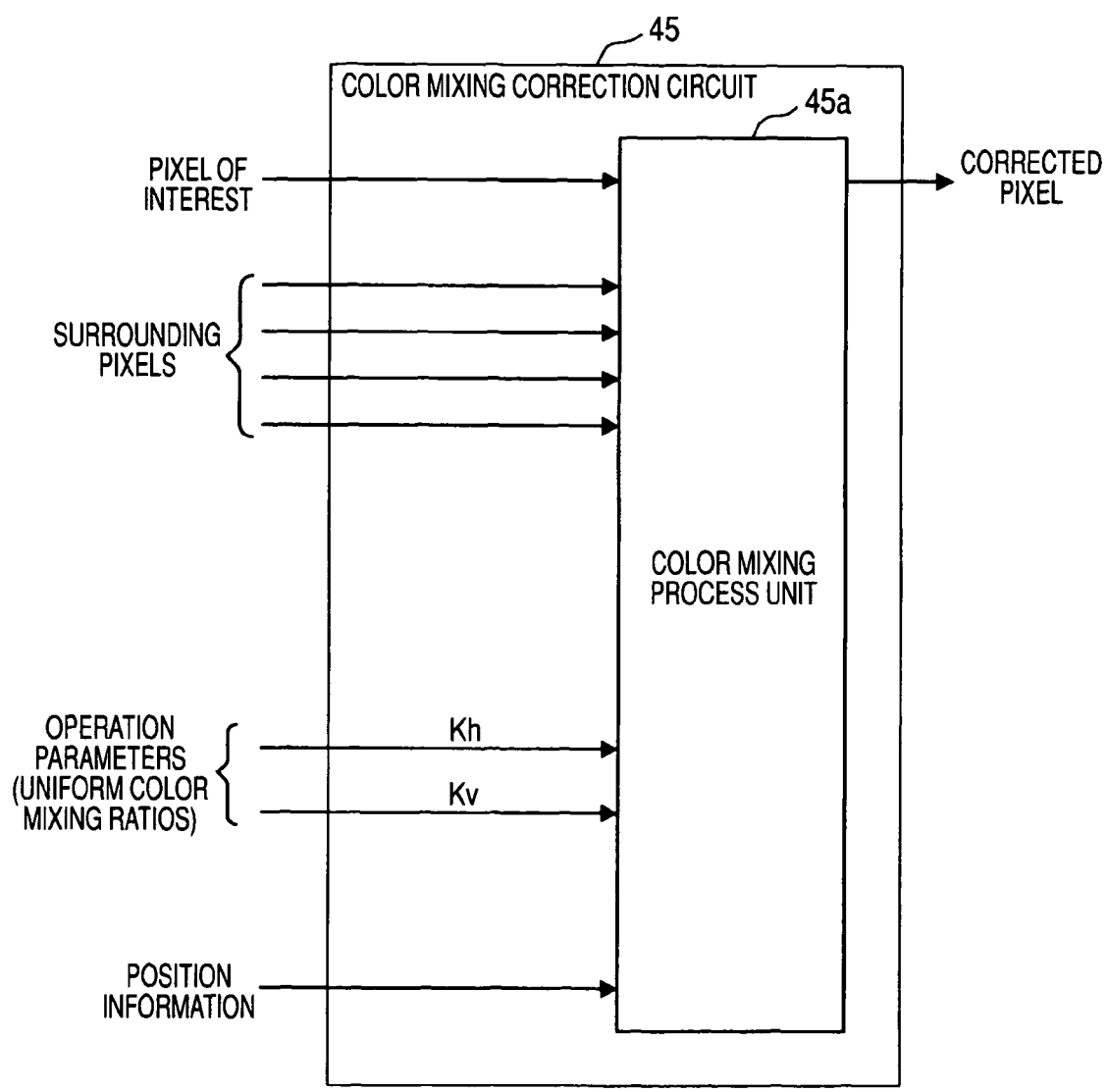
FIG. 11 is a block diagram showing a functional configuration of a color mixing correction circuit included in a signal processing device according to the related art.
Figure 12:
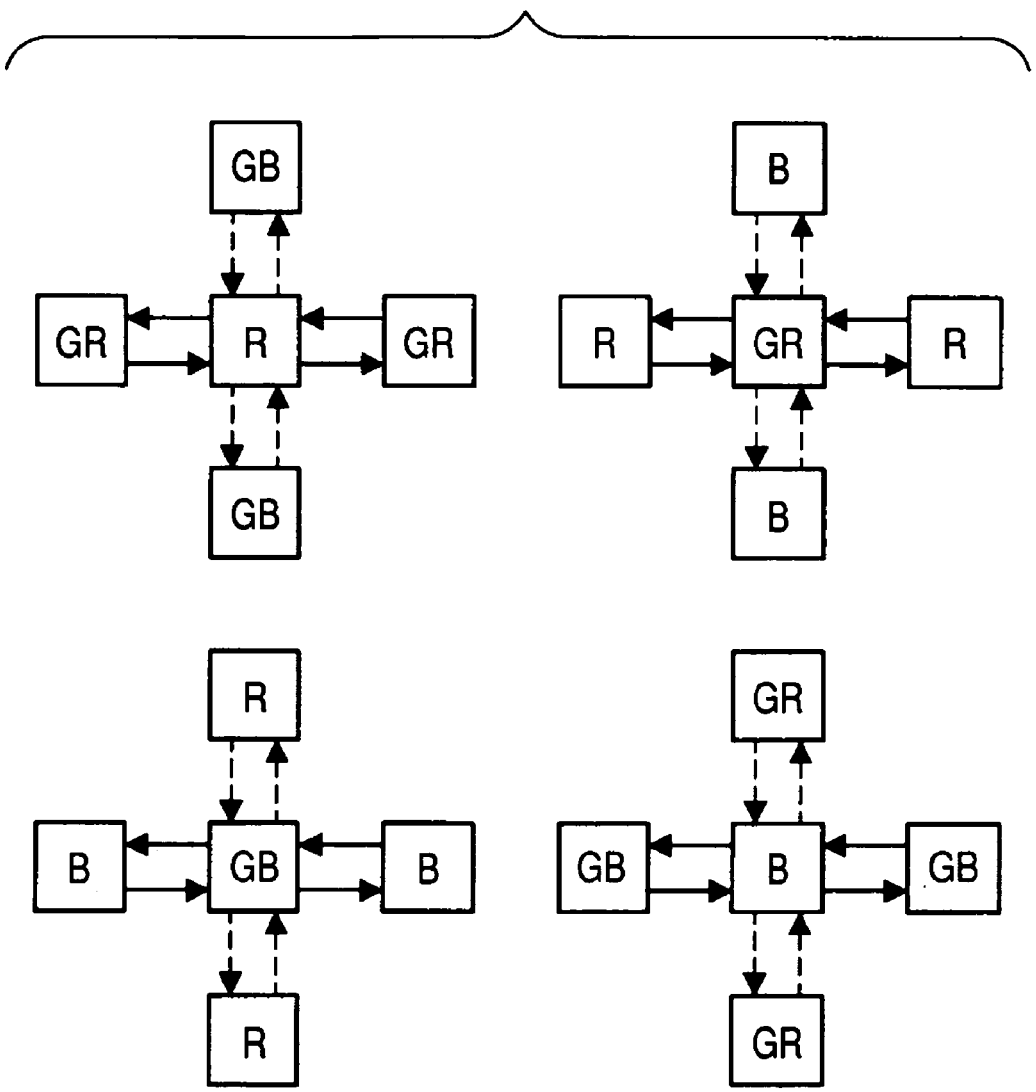
FIG. 12 is an illustration showing an example of a signal processing method associated with color mixing correction according to the related art.

FIG. 11 is a block diagram showing a functional configuration of the color mixing correction circuit included in the signal processing device according to the related art. FIG. 12 is an illustration showing an example of a signal processing method associated with color mixing correction according to the related art.

As shown in FIG. 11, the color mixing correction circuit 45 according to the related art includes a color mixing correction process unit 45a. The color mixing correction process unit 45a receives a signal for a pixel of interest and signals for surrounding pixels adjacent to the pixel of interest input from a first camera signal processing unit. The unit 45a also receives color mixing ratios as correction parameters input from the camera control unit 5 through a communication interface. The color mixing correction process unit 45a acquires position information of an arbitrary pixel in the pixel array surface according to a timing signal input from the signal generator (not shown). The color mixing correction process unit 45a corrects the signal for the pixel of interest using the signals for the surrounding pixels and the correction parameters and outputs the corrected signal for the pixel of interest (corrected pixel) to a second camera signal processing unit. The signal processing device according to the related art uses color mixing ratios which are uniform in row and column directions of the pixel array surface, respectively, as the correction parameters.

The color mixing correction unit 45a included in the signal processing device according to the related art uses the correction parameters which are uniform in each of the row and column directions of the pixel array surface, respectively, to subtract signal components from the signal for the pixel of interest which is in a particular color, according to a certain rate of subtraction calculated from the signals for the surrounding pixels (in colors other than the particular color) adjacent to the pixel of interest. Thus, color mixing between the pixels is corrected. For example, the following equation is used to correct a signal Sr for a pixel of interest in a particular color "R" using signals Sgb and Sgr for surrounding pixels in colors "GB" and "GR" other than the particular color adjacent to the pixel of interest and correction parameters Kh and Kv for the row (horizontal) and column (vertical) directions and to calculate a corrected signal Sr' for the pixel of interest.

$$Sr'=Sr(1+Kv\times2+Kh\times2)-(Sgb\times2\times Kv+Sgr\times2\times Kh) \quad (1)$$

Referring to the right side of Equation 1, signal components which have migrated into the surrounding pixels are returned to the pixel of interest as indicated by the first term, and signal components which have migrated into the pixel of interest are subtracted as indicated by the second term.

In a large-sized solid-state imaging device having fine pixels used in applications such as digital single lens reflex cameras, color mixing occurs differently between central and peripheral regions of a pixel array surface because the angle of incidence of object light varies significantly between those regions. Specifically, since color mixing ratios are two-dimensionally distributed in the pixel array surface, inter-pixel color mixing cannot be properly corrected by using correction parameters which are uniform in the pixel array surface as done in the related art. Mixing ratios are not distributed in a certain fixed shape such as a concentric shape spreading around an optical center as seen when shading a lens. Instead, the shape of a distribution of color mixing ratios depends on the conditions of the solid-state imaging device, lens, and the diaphragm.

First Embodiment

A signal processing device and a signal processing method for correcting color mixing according to a first embodiment of the invention will now be described. In the signal processing device and signal processing method according to the present embodiment, correction parameters are two-dimensionally distributed in a pixel array surface on which a plurality of pixels are arranged.

(Functional Configuration of Signal Processing Device)

FIG. 3 is a block diagram showing a functional configuration of a color mixing correction circuit included in the signal processing device of the present embodiment.

As shown in FIG. 3, a color mixing correction circuit 145 includes a color mixing correction process unit 145a (45a) serving as a signal correction unit, and a parameter (control point) selection unit 145b and a two-dimensional parameter interpolation unit 145c serving as a parameter distribution unit. The color mixing correction process unit 145a, the parameter selection unit 145b, and the two-dimensional parameter interpolation unit 145c acquire information on the position of an arbitrary pixel in a pixel array surface according to a timing signal input from a signal generator 148.

As will be described later, the parameter selection unit 145b receives a correction parameter (color mixing ratio) for each control point provided in the pixel array surface input from a camera control unit 150 through a communication interface 146. The unit 145b selects correction parameters to be subjected to a two-dimensional parameter interpolation process from among the input correction parameters.

The selected correction parameters are input from the parameter selection unit 145b to the two-dimensional parameter interpolation unit 145c. As will be described later, the unit 145c interpolates correction parameters for signals for surrounding pixels adjacent to pixels of interest in the pixel array surface using the input correction parameters.

The color mixing correction process unit 145a receives a signal for the pixel of interest and the signals for the surrounding pixels adjacent to the pixels of interest input from a first camera processing unit 143 like the color mixing correction process unit 45a included in the signal processing device according to the related art shown in FIG. 11. The color mixing correction process unit 145a also receives interpolated correction parameters input from the two-dimensional parameter interpolation unit 145c.

For example, as shown in FIG. 12, the parameter selection unit 145b and the two-dimensional parameter interpolation unit 145c calculate correction parameters Kh and Kv for signals for respective surrounding pixels horizontally and vertically adjacent to respective pixels of interest using the correction parameters for the control points. Like the color mixing correction process unit 45a of the signal processing device according to the related art, the color mixing correction process unit 145a corrects the signals for the pixels of interest using the signals for the surrounding pixels and the correction parameters Kh and Kv, for example, according to Equation 1. The corrected signals for the pixels of interest (corrected pixels) are output to a second camera signal processing unit 144.

In summary, in the signal processing device 100 according to the present embodiment of the invention, the parameter selection unit 145b and the two-dimensional parameter interpolation unit 145c serving as the parameter distribution unit are added to an existing color mixing correction circuit 45 included in a signal processing device according to the related art to allow correction parameters to be two-dimensionally distributed in a pixel array surface.

(Signal Processing Method)

Figure 4:
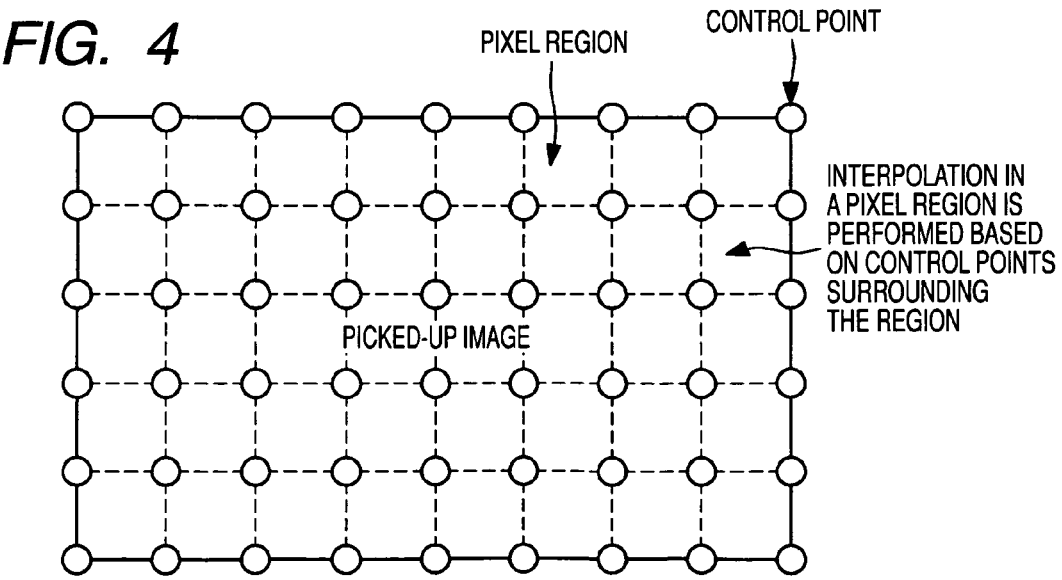
FIG. 4 is an illustration showing control points provided on a pixel array surface.

FIG. 4 is an illustration showing control points provided on a pixel array surface.

As shown in FIG. 4, the pixel array surface is divided into a plurality of pixel regions, and control points at which correction parameters (color mixing ratios) are set are provided at boundaries between the pixel regions. The pixel array surface is formed by part of pixels two-dimensionally arranged on a solid-state imaging device 2, the part of pixels being located in an area corresponding to an imaging surface on which incident light from an object is imaged.

For example, the correction parameter set at a control point may be calculated from an average value of pixels arranged in the region around the control point. For example, the correction parameter at each control point is calculated by detecting color mixing ratios of the regions surrounding the point when the solid-state imaging device 2 is shipped. The camera control unit 150 acquires information on the distribution of the calculated color mixing ratios in advance.

In the example shown in FIG. 4, a correction parameter in a particular position (an arbitrary surrounding pixel) in the pixel array surface is interpolated from the correction parameters for the control points provided at four corners of the pixel region which includes the surrounding pixel therein or which has a boundary extending through the surrounding pixel.

Thus, correction parameters two-dimensionally distributed in the pixel array surface can be calculated. Further, correction parameters can be two-dimensionally distributed in the pixel array surface only by setting correction parameters at each of the control points which are provided in a required minimum quantity.

The pixel array surface shown in FIG. 4 is divided into rectangular pixel regions which are equal in width in each of the row and column directions. Alternatively, the pixel array surface may be divided into pixel regions having a shape other than the rectangular shape, e.g., a triangular shape or rhombic shape.

FIG. 5 is illustrations showing a method for calculating a correction parameter using linear interpolation in a particular position (arbitrary surrounding pixel) in the pixel array surface shown in FIG. 4.

FIG. 5 shows a pixel region including a surrounding pixel and having a width Wh in the row (horizontal) direction and a with Wv in the column (vertical) direction. The surrounding pixel is located at a distance Hq from a left-side boundary of the pixel region and at a distance Vq from a top-side boundary of the same. At the four corners of the pixel region, sets of correction parameters (Klu, Kru) and (Kld, Krd) are set at two respective pairs of control points adjacent to each other in the row direction.

In the example shown in FIG. 5, let us first focus on the row direction of the surrounding pixel. An interpolation value Ku is calculated on the top-side boundary of the pixel region, and an interpolation value Kd is calculated on a bottom-side boundary of the region. The interpolation value Ku is calculated by performing linear interpolation using the correction parameters Klu and Kru and the distance Hq from the left-side boundary to the surrounding pixel. Similarly, the interpolation value Kd is calculated by performing linear interpolation using the correction parameters Kld and Krd and the distance Hq.

Referring now to the column direction of the surrounding pixel, a correction parameter K for the surrounding pixel is calculated from the interpolation values Ku and Kd. The correction parameter K is calculated by performing linear interpolation using the interpolation values Ku and Kd and the distance Vq from the top-side boundary to the surrounding pixel.

Thus, a correction parameter K can be calculated through linear interpolation for each of signals for surrounding pixels using the correction parameters Klu, Kru, Kld, and Krd set at control points. Especially, when the correction parameters are distributed in a shape suitable for linear approximation, the correction parameter K for each of the signals for the surrounding pixels can be calculated with high accuracy.

Figure 6:
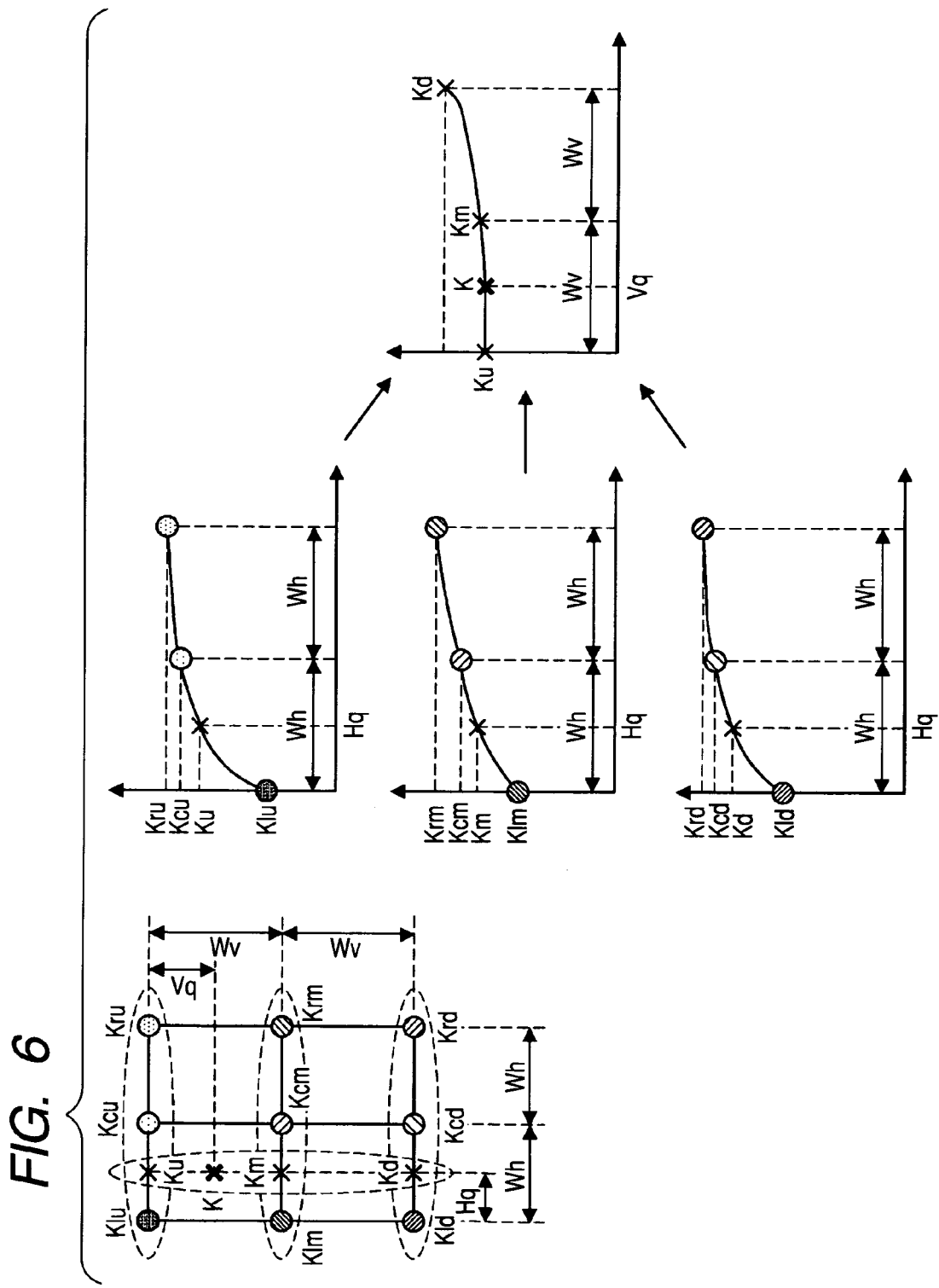
FIG. 6 is illustrations showing a method for calculating a correction parameter using curved interpolation.

FIG. 6 is illustrations showing a method for calculating a correction parameter using curved interpolation in a particular position (arbitrary surrounding pixel) in the pixel array surface shown in FIG. 4.

FIG. 6 shows four pixel regions each of which has a width Wh in the row (horizontal) direction and a width Wv in the column (vertical) direction and which are adjacent to each other in the row and column directions of the pixel array surface. In the following description, the four pixel regions may be also collectively referred to as "a pixel region block". The top left pixel region of the pixel region block includes a surrounding pixel. The surrounding pixel is located at a distance Hq from a left-side boundary of the pixel region block and at a distance Vq from a top-side boundary of the same.

A boundary between the two upper pixel regions forming the pixel region block and the two lower pixel regions is referred to as a center boundary. Sets of correction parameters (Klu, Kcu, Kru), (Klm, Kcm, Krm), and (Kld, Kcd, Krd) are set at three respective sets of control points adjacent to each other in the row direction on the top-side boundary, the center boundary, and a bottom-side boundary of the pixel region block.

In the example shown in FIG. 6, let us first focus on the row direction of the surrounding pixel. An interpolation value Ku is calculated on the top-side boundary of the pixel region. An interpolation value Km is calculated on the center boundary.

An interpolation value Kd is calculated on the bottom-side boundary. The interpolation value Ku is calculated by performing curved interpolation using the correction parameters Klu, Kcu, and Kru and the distance Hq from the left-side boundary to the surrounding pixel. Similarly, the interpolation value Km is calculated by performing curved interpolation using the correction parameters Klm, Kcm, and Krm and the distance Hq. The interpolation value Kd is calculated by performing curved interpolation using the correction parameters Kld, Kcd, and Krd and the distance Hq.

Referring now to the column direction of the surrounding pixel, a correction parameter K for the surrounding pixel is calculated from the interpolation values Ku, Km, and Kd. The correction parameter K is calculated by performing curved interpolation using the interpolation values Ku, Km, and Kd and the distance Vq from the top-side boundary to the surrounding pixel.

The curved interpolation used to obtain the correction parameter K and the interpolation values Ku, Km, and Kd may be spline interpolation, Lagrange's interpolation, Beje interpolation, or a combination of those interpolation schemes.

Thus, a correction parameter K can be calculated through curved interpolation for each of signals for surrounding pixels using the correction parameters Klu, Kcu, Kru, Klm, Kcm, Krm, Kld, Kcd, and Krd set at control points. Especially, when the correction parameters are distributed in a shape suitable for curved approximation, the correction parameter K for each of the signals for the surrounding pixels can be calculated with high accuracy.

Figure 7:
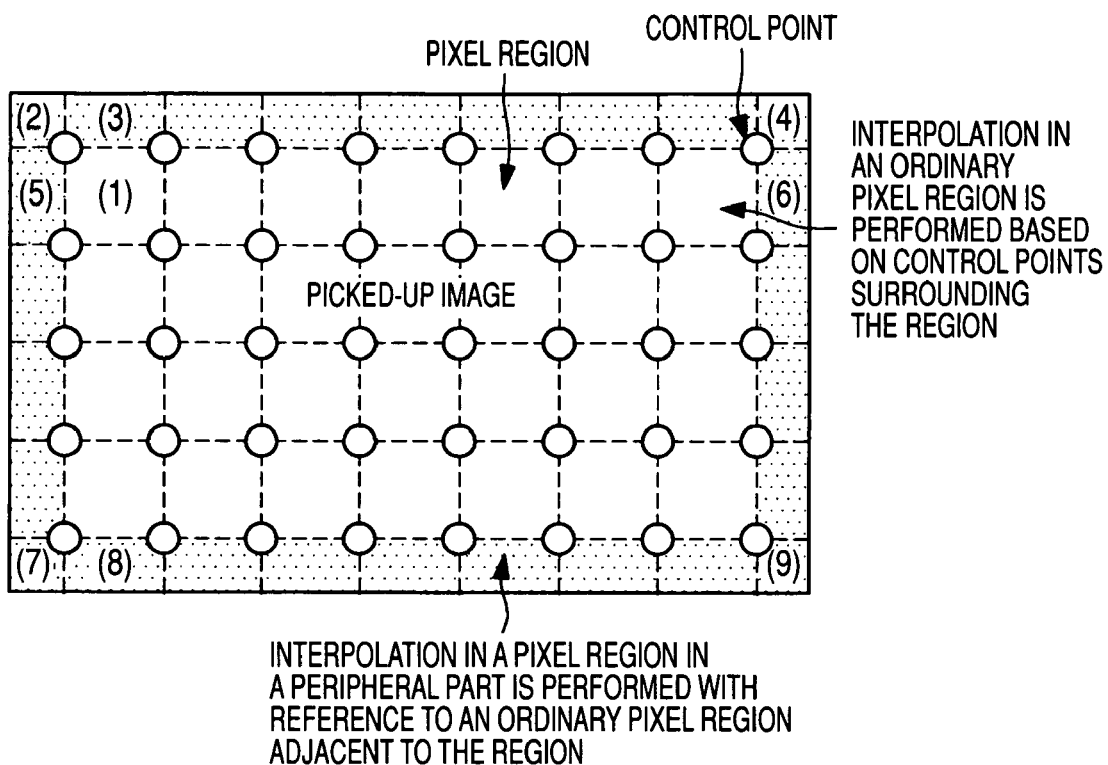
FIG. 7 is an illustration showing control points provided on a pixel array surface which includes a pixel region having no correction parameter at a peripheral part thereof.

FIG. 7 is an illustration showing control points provided on a pixel array surface which includes a pixel region having no correction parameter located at a peripheral part thereof.

When correction parameters (color mixing ratios) are set at the control points provided on the pixel array surface, the correction parameter set at each control point is calculated from an average value of pixels arranged in the region around the control point. It may be sometimes difficult to calculate correction parameters at a peripheral part of the pixel array surface.

In such a case, a peripheral pixel region having no correction parameter is provided at the peripheral part of the pixel array surface, and the peripheral pixel region is processed with reference to correction parameters for an ordinary pixel region adjacent to the same.

In the example shown in FIG. 7, a correction parameter K for a surrounding pixel included in the peripheral part of the pixel array surface is interpolated with reference to the ordinary pixel region adjacent to the peripheral pixel region which includes the surrounding pixel therein or which has a boundary extending through the surrounding pixel. Specifically, the parameter is interpolated from correction parameters Klu, Kld, Kru, and Krd for the control points provided at the four corners of the ordinary pixel region.

The pixel array surface of the solid-state imaging device 2 may or may not include a pixel region having control points at only part of the four corners thereof depending on the condition of the pixel array surface. It is therefore desirable to configure the parameter distribution unit such that methods for calculating a correction parameter K can be switched depending on the condition of the pixel array surface. Thus, a correction parameter K can be calculated for each of signals for surrounding pixels depending on the solid-state imaging device 2 that is used.

Figure 8:
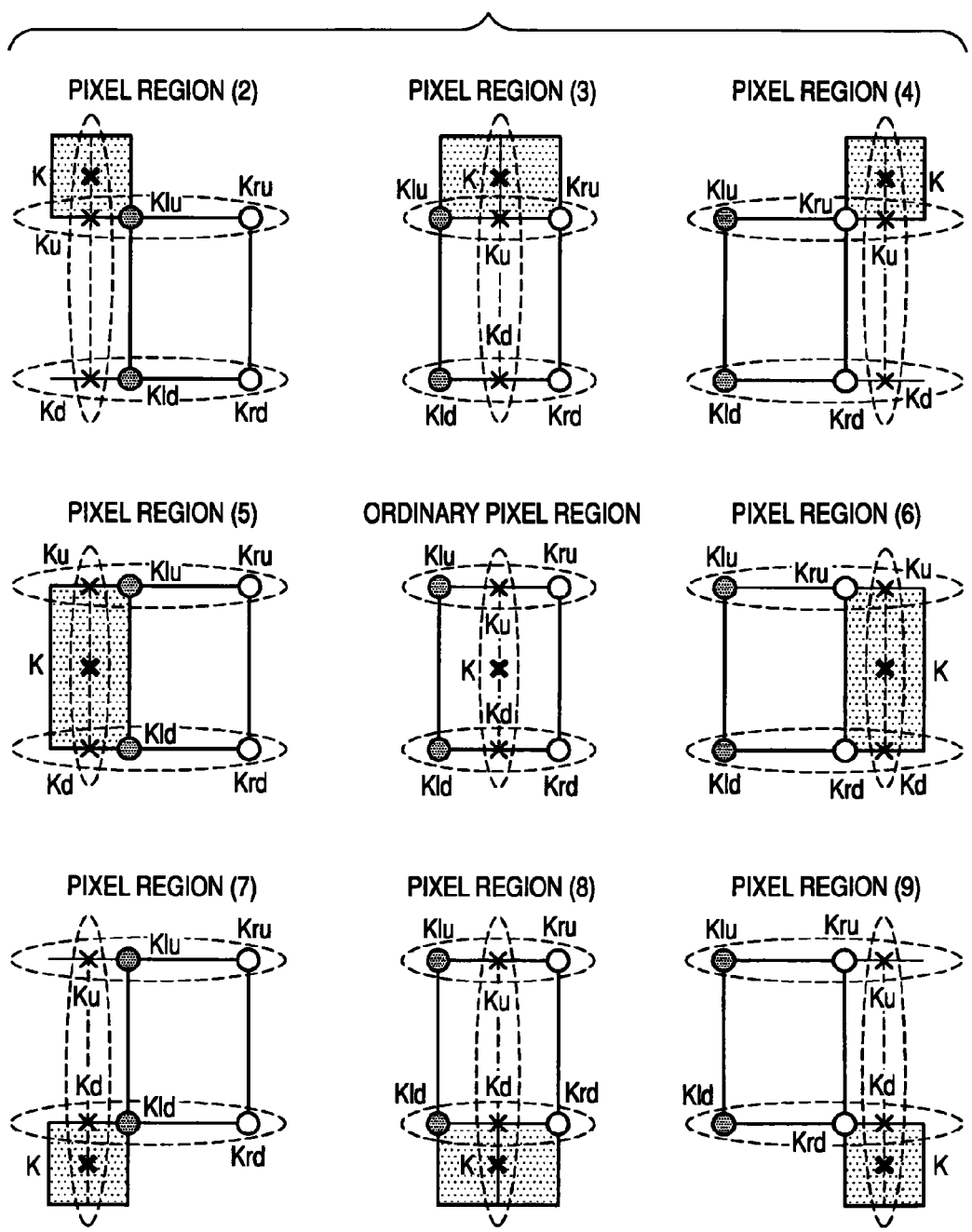
FIG. 8 is illustrations showing methods for calculating a correction parameter using interpolation.

FIG. 8 is illustrations showing methods for calculating a correction parameter K using interpolation in particular positions (arbitrary surrounding pixels) included in peripheral parts of the pixel array surface shown in FIG. 7.

FIG. 8 shows an ordinary pixel region referred to for calculating a correction parameter K for a surrounding pixel in each of peripheral pixel regions 2 to 9 shown in FIG. 7.

Referring to the pixel region 2 at the top left corner of the pixel array surface, a correction parameter K for the surrounding pixel included in the pixel region 2 is interpolated with reference to an adjacent ordinary pixel region located under the pixel region 2 and to the right of the same. Specifically, the parameter is interpolated from correction parameters Klu, Kru, Kld, and Krd for control points provided at the four corners of the ordinary pixel region.

Referring to the pixel region 3 at the top of the pixel array surface, a correction parameter K for the surrounding pixel included in the pixel region 3 is interpolated with reference to an adjacent ordinary pixel region located under the pixel region 3. Specifically, the parameter is interpolated from correction parameters Klu, Kru, Kld, and Krd for control points provided at the four corners of the ordinary pixel region.

Figures 9A, 9B, 10:
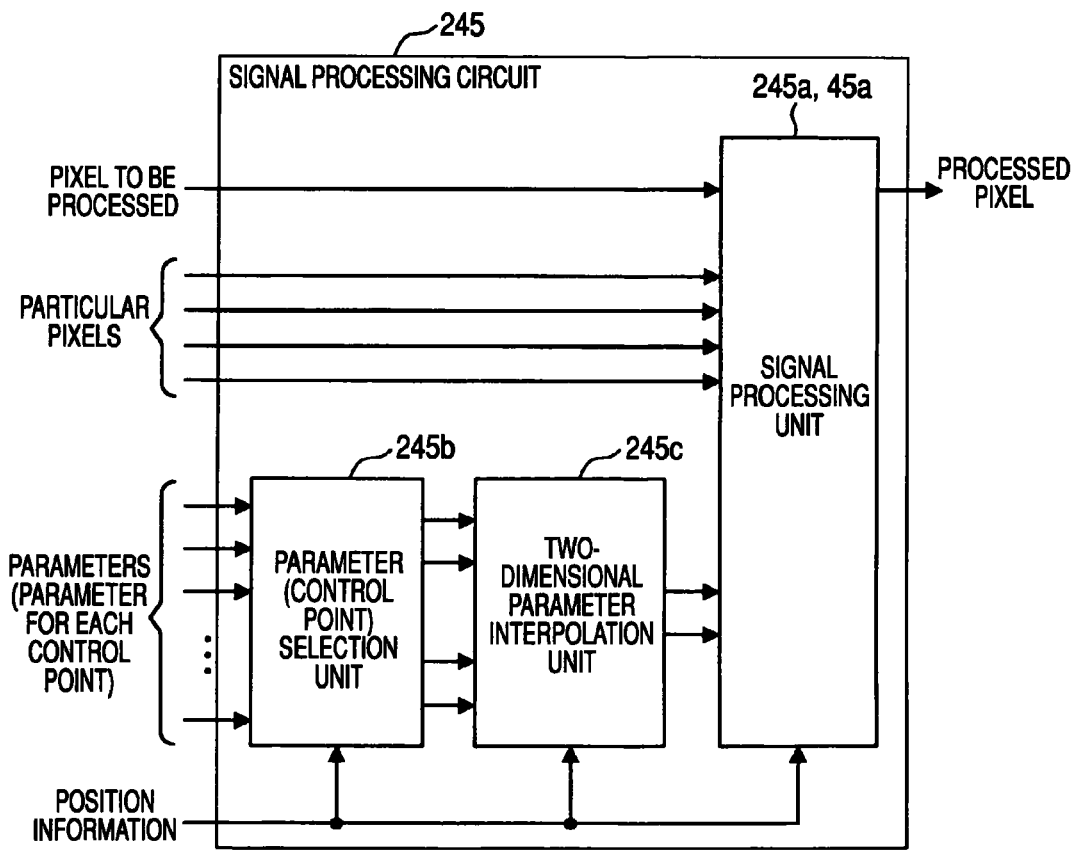
FIGS. 9A and 9B are illustrations showing examples of methods for calculating a correction parameter using interpolation.
FIG. 10 is a block diagram showing a functional configuration of a signal processing circuit included in a signal processing device according to a second embodiment of the invention.

FIGS. 9A and 9B are illustrations showing examples of methods for calculating a correction parameter K using interpolation in particular positions (arbitrary surrounding pixels) included in peripheral parts of the pixel array surface shown in FIG. 7.

FIGS. 9A and 9B show methods of calculating interpolation values Ku on top-side boundaries of the pixel regions 5 and 6 shown in FIG. 7, respectively.

The interpolation value Ku of the pixel region 5 shown in FIG. 9A is calculated by performing extrapolation using correction parameters Kru and Klu for control points provided on a top-side boundary of an ordinary pixel region which is located adjacent to the pixel region 5 and on the right side thereof and the distance (Hq) from a left-side boundary of the same to the surrounding pixel. The interpolation value Ku of the pixel region 6 shown in FIG. 9B is calculated by performing extrapolation using correction parameters Kru and Klu for control points provided on a top-side boundary of an ordinary pixel region which is located adjacent to the pixel region 6 and on the left side thereof and the distance (Wh+Hq) from a right-side boundary of the same to the surrounding pixel.

To calculate correction parameters K for the surrounding pixels in the pixel regions 5 and 6, interpolation values Kd on bottom-side boundaries of the pixel regions are similarly calculated using extrapolation. The correction parameters K for the surrounding pixels are calculated by performing extrapolation using interpolation values Ku and Kd at the surrounding pixels and the distance Hv from the top-side boundaries to the surrounding pixels.

Thus, even in the pixel regions located at the periphery of the pixel array surface and having control points at only part of the four corners thereof, a correction parameter K for each of the signals for the surrounding pixels in those regions can be calculated by performing interpolation using correction parameters Klu, Kru, Kld, and Krd set for the adjacent pixel regions.

(Advantages of the First Embodiment)

The signal processing device 100 for an imaging device and the signal processing method according to the above-described embodiments are advantageous in that inter-pixel color mixing can be properly corrected even when color mixing ratios are two-dimensionally distributed in a pixel array surface because correction parameters for signals for surrounding pixels are two-dimensionally distributed in the pixel array surface.

The above description has addressed a case in which correction parameters K for signals for surrounding pixels are calculated by performing linear interpolation or curved interpolation using correction parameters set at control points. The correction parameters K may alternatively be calculated using a combination of linear interpolation and curved interpolation depending on the shape of distribution of the correction parameters.

The above description has addressed a case in which interpolation values (Ku, Kd; Ku, Km, Kd) in the row direction of a surrounding pixel are first calculated and a correction parameter K for the surrounding pixel is thereafter calculated in the column direction of the surrounding pixel using the interpolation values. Alternatively, interpolation values (Kl, Kr; Kl, Kc, Kr) in the column direction of the surrounding pixel may be first calculated, and the correction parameter K for the surrounding pixel may be thereafter calculated in the row direction of the surrounding pixel using the interpolation values.

The above description has addressed a case in which a correction parameter K for a surrounding pixel included in a peripheral part of the pixel array surface is calculated using linear interpolation. Alternatively, the correction parameter K for the surrounding pixel included in the peripheral part of the pixel array surface may be calculated using curved interpolation instead of linear interpolation.

Second Embodiment

A signal processing device according to a second embodiment of the invention will now be described.
(Functional Configuration of Signal Processing Device)
FIG. 10 is a block diagram showing a functional configuration of a signal processing circuit included in the signal processing device according to the present embodiment.

Like the color mixing correction circuit 145 shown in FIG. 3, a signal processing circuit 245 includes a signal processing unit 245a and a parameter (control point) selection unit 245b and a two-dimensional parameter interpolation unit 245c serving as a parameter distribution unit. The functional configurations of the parameter selection unit 245b and the two-dimensional parameter interpolation unit 245c will not be described in detail because they are basically the same as those in the color mixing correction circuit 145 described above.

While the color mixing correction circuit 145 shown in FIG. 3 is formed as part of the signal processing device 100 correcting inter-pixel color mixing at the solid-state imaging device 2, the signal processing circuit 245 shown in FIG. 10 is not limited to correction of color mixing, and the circuit may be formed as part of a common signal processing apparatus for processing signals for pixels to be processed.

Specifically, the signal processing circuit 245 is used in a signal processing device for a solid-state imaging device processing signals for pixels using uniform parameters in a pixel array surface on which a plurality of pixels are arranged. Applications of the signal processing device 245 include, for example, a lens shading correcting process and a dark current correcting process.

The signal processing circuit 245 includes the parameter selection unit 245b and the two-dimensional parameter interpolation unit 245c serving as the parameter distribution unit for producing a two-dimensional distribution of parameters in a pixel array surface by interpolating parameters for signals for particular pixels using a parameter non-uniformly set at each of control points in the pixel array surface, the control points being points at boundaries between a plurality of pixel regions formed by dividing the pixel array surface.
Advantage of the Second Embodiment
The above-described signal processing device for a solid-state imaging device according to the present embodiment has the following advantageous. Even when it is used as a signal processing device for a solid-state imaging device processing a signal for a pixel using parameters which are uniform in a pixel array surface, the parameter selection unit 245b and the two-dimensional parameter interpolation unit 245c serving as the parameter distribution unit allow the signal for the pixel of interest to be properly processed using parameters two-dimensionally distributed in the pixel array surface.

It should be understood by those skilled in the art that various modifications, combinations, sub-combinations and alterations may occur depending on design requirements and other factors insofar as that are within the scope of the appended claims or the equivalents thereof.

What is claimed is:

1. A signal processing device for a solid-state imaging device correcting inter-pixel color mixing in the solid-state imaging device in which color filters having a color component constituting a primary component among luminance components and other color components are disposed on a surface of a two-dimensional array of pixels including a photoelectric conversion element, comprising:
a parameter distribution unit two-dimensionally distributing correction parameters in a pixel array surface on which a plurality of pixels are arranged; and
a signal correcting unit correcting a signal for a pixel of interest using each of signals for a plurality of surrounding pixels adjacent to the pixel of interest in the pixel array surface and using two-dimensionally distributed correction parameters for each of the signals.

2. A signal processing device for a solid-state imaging device according to claim 1, wherein the parameter distribution unit interpolates the correction parameters for each of the signals for the surrounding pixels using a correction parameter set for each of control points which are points at boundaries between a plurality of pixel regions formed by dividing the pixel array surfce.

3. A signal processing device for a solid-state imaging device according to claim 2, wherein the parameter distribution unit obtains two interpolation values by performing linear interpolation of correction parameters set for two pairs of control points adjacent to each other in either row direction or column direction of the pixel array surface and linearly interpolates the correction parameters for each of the signals for the surrounding pixels using the two interpolation values in the other of the row and column directions.

4. A signal processing device for a solid-state imaging device according to claim 2, wherein the parameter distribution unit obtains three interpolation values by performing curved interpolation of correction parameters set for three pairs of control points of four pixel regions adjacent to each other in the row and column directions of the pixel array surface, each pairs of control points being adjacent to each other in either row or column direction of the pixel array surface, the parameter distribution unit performing curved interpolation of the correction parameters for each of the signals for the surrounding pixels using the three interpolation values in the other of the row and column directions.

5. A signal processing device for a solid-state imaging device according to claim 2, wherein the parameter distribution unit interpolates correction parameters for each of signals for surrounding pixels in a pixel region located in a peripheral part of the pixel array surface and having control points only at part of four corners thereof using correction parameters set for control points provided at four corners of a pixel region adjacent to the pixel region of interest.

6. A signal processing device for a solid-state imaging device according to claim 5, wherein the parameter distribution unit switches methods of calculating correction parameters for each of signals for surrounding pixels depending on whether the pixel array surface includes a pixel region having control points at only part of four corners thereof or not.

7. A signal processing device for a solid-state imaging device processing a signal for a pixel using uniform parameters in a pixel array surface on which a plurality of pixels are arranged, comprising:
a parameter distribution unit interpolating a parameter for a signal for a particular pixel using a parameter non-uniformly set for each of control points in the pixel array surface to two-dimensionally distribute parameters in the pixel array surface, the control points being points at boundaries between a plurality of pixel regions formed by dividing the pixel array surface; and
a signal processing unit processing a signal for a pixel to be processed using the two-dimensionally distributed parameters for the particular pixel, in which said processing includes correcting inter-pixel color mixing.

8. An imaging apparatus comprising:
an image forming unit for optically forming an image of an object on a solid-stage imaging device; and
a signal processing device for a solid-state imaging device according to claim 1.

9. An imaging apparatus comprising:
an image forming unit for optically forming an image of an object on a solid-stage imaging device; and
a signal processing device for a solid-state imaging device according to claim 7.

10. A signal processing method used in a signal processing device correcting inter-pixel color mixing in a solid-state imaging device in which color filters having a color component constituting a primary component among luminance components and other color components are disposed on a surface of a two-dimensional array of pixels including a photoelectric conversion element, the method comprising the steps of:
two-dimensionally distributing correction parameters by use of a parameter distribution unit of the signal processing device in a pixel array surface on which a plurality of pixels are arranged; and
correcting by use of a signal correcting unit of the signal processing device a signal for a pixel of interest using each of signals for a plurality of surrounding pixels adjacent to the pixel of interest in the pixel array surface and using the two-dimensionally distributed correction parameters for each of the signals.

11. A signal processing method used in a signal processing device for a solid-state imaging device processing a signal for a pixel using uniform parameters in a pixel array surface on which a plurality of pixels are arranged; the method comprising the steps of:
interpolating by use of a parameter distribution unit of the signal processing device a parameter for a signal for a particular pixel using a parameter non-uniformly set for each of control points in the pixel array surface to two-dimensionally distribute parameters in the pixel array surface, the control points being points at boundaries between a plurality of pixel regions formed by dividing the pixel array surface; and
processing by use of a signal processing unit of the signal processing device a signal for a pixel to be processed using the two-dimensionally distributed parameters for the particular pixel, in which said processing includes correcting inter-pixel color mixing.

12. An image processing system comprising a computer and a software program executable on the computer, said program described in a computer-readable manner for execution of signal processing on the computer to correct inter-pixel color mixing in a solid-state imaging device in which color filters having a color component constituting a primary component among luminance components and other color components are disposed on a surface of a two-dimensional array of pixels including a photoelectric conversion element, the program causing the computer to function as:
parameter distributing means for two-dimensionally distributing correction parameters in a pixel array surface on which a plurality of pixels are arranged; and
signal correcting means for correcting a signal for a pixel of interest using each of signals for a plurality of surrounding pixels adjacent to the pixel of interest in the pixel array surface and using the two-dimensionally distributed correction parameters for each of the signals.

13. An image processing system comprising a computer and a software program executable on the computer, said program described in a computer-readable manner to execute signal processing of a pixel on the computer using uniform parameters in a pixel array surface on which a plurality of pixels are arranged, the program causing the computer to function as:
parameter distributing means for interpolating a parameter for a signal for a particular pixel using a parameter non-uniformly set for each of control points in the pixel array surface to two-dimensionally distribute parameters in the pixel array surface, the control points being points at boundaries between a plurality of pixel regions formed by dividing the pixel array surface; and
signal processing means for processing a signal for a pixel to be processed using the two-dimensionally distributed correction parameters for the particular pixel, in which said processing includes correcting inter-pixel color mixing.

* * * * *

UNITED STATES PATENT AND TRADEMARK OFFICE
CERTIFICATE OF CORRECTION

PATENT NO. : 8,115,838 B2
APPLICATION NO. : 12/287101
DATED : February 14, 2012
INVENTOR(S) : Akihiro Tamaoki It is certified that error appears in the above-identified patent and that said Letters Patent is hereby corrected as shown below:

Title Page, Item (54) and at Column 1, line 8 in the Title, immediately after "ratios", "re" should read --are--.

Signed and Sealed this
Twenty-seventh Day of March, 2012

David J. Kappos
*Director of the United States Patent and Trademark Office*